United States Patent [19]

Fillon et al.

[11] 4,425,009

[45] Jan. 10, 1984

[54] DUPLEX ANGULAR ROLLING-CONTACT BEARING AND METHOD OF ASSEMBLING SAME

[75] Inventors: Marcel Fillon, Alfortville; Jean M. Monville, Paris, both of France

[73] Assignee: SKF Compagnie d'Applications Mecaniques, Clamart, France

[21] Appl. No.: 338,601

[22] Filed: Jan. 11, 1982

[30] Foreign Application Priority Data

Jan. 30, 1981 [FR] France ................. 81 01889

[51] Int. Cl.³ .......................................... F16C 33/60
[52] U.S. Cl. ................... 308/187.1; 308/196; 29/148.4 A
[58] Field of Search ............... 308/187.1, 196, 189 R, 308/207 R, 213, 197, 195; 29/148.4 A

[56] References Cited

U.S. PATENT DOCUMENTS

| 1,222,846 | 4/1917 | Carlson | 308/196 |
|---|---|---|---|
| 1,325,910 | 12/1919 | Reynolds | 308/196 |
| 1,884,925 | 10/1932 | Vanderbeek | |
| 4,089,570 | 5/1978 | Markfelder et al. | 308/196 |

FOREIGN PATENT DOCUMENTS

| 2138199 | 5/1973 | France . |
|---|---|---|
| 23474567 | 4/1977 | France . |
| 2372988 | 6/1978 | France . |
| 131744 | 9/1919 | United Kingdom . |
| 542669 | 1/1942 | United Kingdom . |

Primary Examiner—Lenard A. Footland
Attorney, Agent, or Firm—Owen, Wickersham & Erickson

[57] ABSTRACT

The registering front faces of the two portions (8, 9) of the outer race comprise each at least two precision-machined axial projections forming together a radial reference surface. In each portion the projections are separated by axial recesses each adapted to be engaged by a corresponding axial projection of the other portion so that after a relative rotation of the two portions of the outer race the rolling elements (19) of the second row can easily be fitted in position, the bearing being completed by encompassing the joint plane formed between the two portions with an annular seal, for example in the form of a rubber flat ring. Thus, the permissible bearing load is increased since the two rows (18, 19) of rolling elements have the same number of such rolling elements.

10 Claims, 5 Drawing Figures

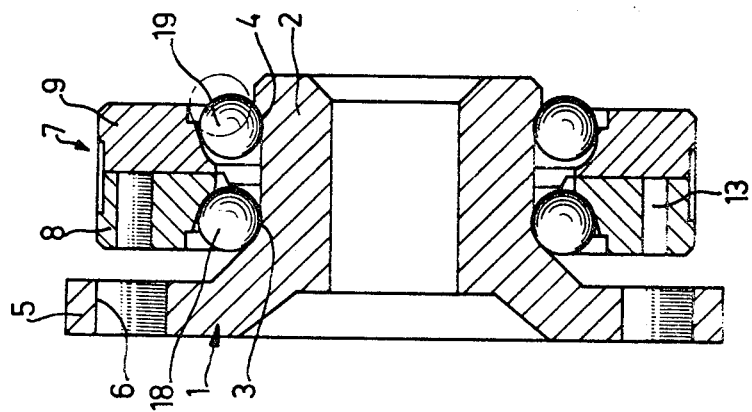
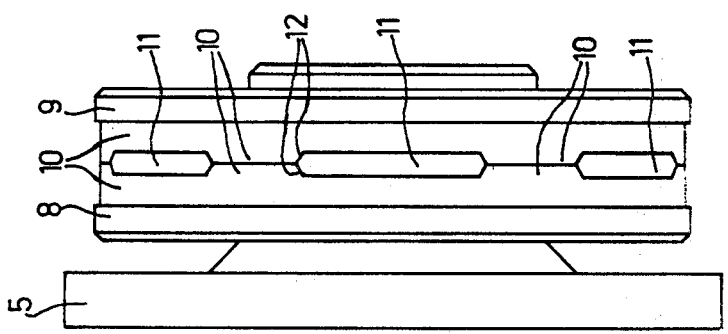
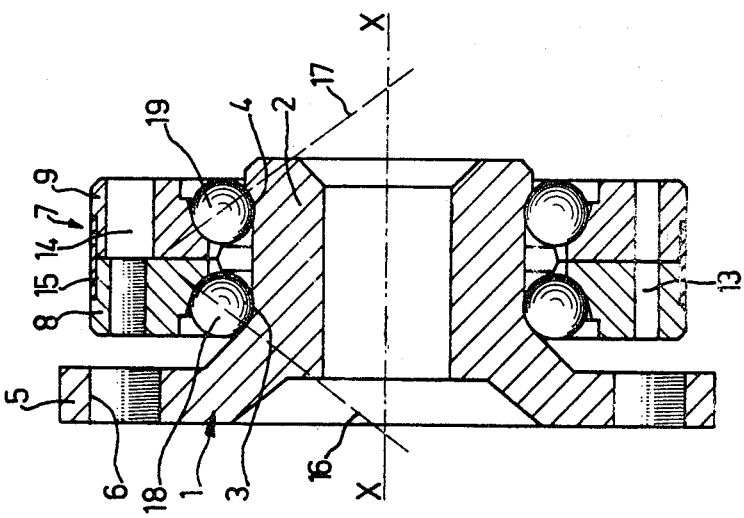

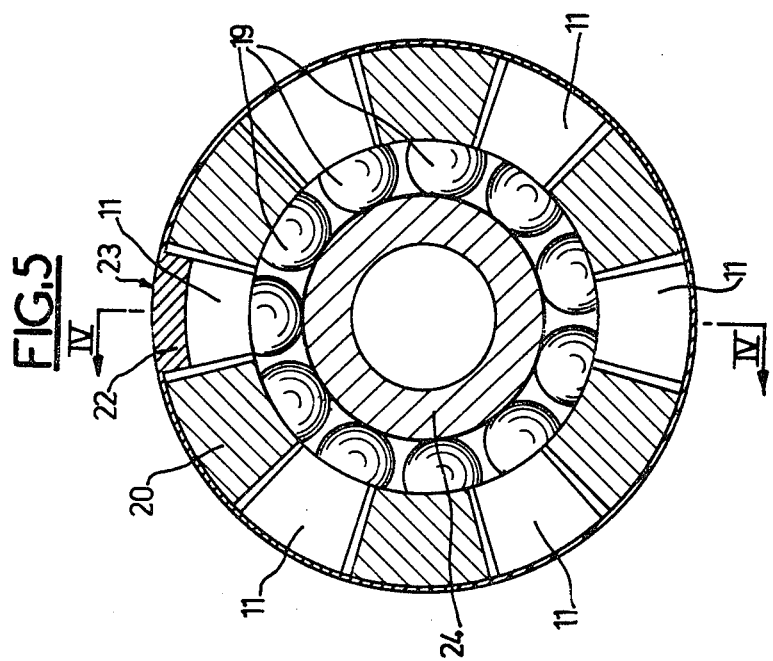
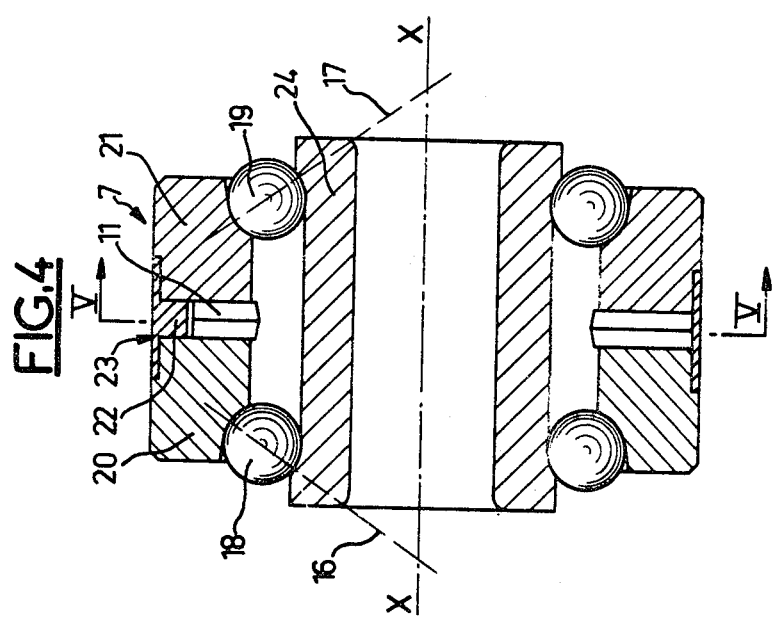

DUPLEX ANGULAR ROLLING-CONTACT BEARING AND METHOD OF ASSEMBLING SAME

BACKGROUND OF THE INVENTION

1. Field of the Invention

This invention relates to an improved angular ball bearing of the duplex type, which comprises two rows of rolling-contact members and has a structure such that its load capacity can be increased without changing the bearing dimensions. This invention is applicable to oblique-contact rolling element bearings of the type wherein the two rows of rolling-contact elements are mounted according to the so-called 'O' arrangement, that is, wherein the lines of action of the loads on the rolling elements of one row converge in a direction opposite that of the other row.

2. The Prior Art

An angular-contact or oblique-contact ball bearing of this type, intended more particularly for mounting the wheels of motor vehicles, is already known through the French Pat. No. 2,372,988: the bearing depicted therein comprises two rows of rolling-contact elements with an axially split outer race. The use of this split outer race is advantageous in that it is possible therewith, during the assembling of one of the rows of rolling elements, to insert a greater number of such rolling elements, this assembling step being accomplished before fitting the second half of the outer race. On the other hand, in this known construction the second row of rolling elements can be filled only along about one-half of its periphery with rolling elements, this filling operation being accomplished by shifting the outer race eccentrically in relation to the inner race.

Therefore, the angular bearing thus obtained has eventually two rows of rolling elements, one row comprising a minor number of rolling elements. As a result, the bearing has a certain weakness and its resistance to running efforts is asymmetrical, and this may prove detrimental in certain applications.

The U.S. Pat. No. 1,884,925 discloses a bearing comprising two rows of tapered rollers, also with a split outer race to permit the mounting of the second row of rolling elements. A two-section separator ring is then mounted between the two portions of the outer race to complete the assembling operation. Though this form of embodiment actually permits of mounting the same number of rolling elements in both rows of the bearing, it implies compulsorily the grinding not only of the separator ring but also of the two front faces registering with the outer race portions with a high degree of precision to accurately set the necessary bearing play. Moreover, the spacer ring must be retained in position by additional external means.

SUMMARY OF THE INVENTION

It is the primary object of the present invention to provide an angular ball bearing of the duplex type, i.e. comprising two rows of rolling-contact elements, such that it is possible to provide the same number of rolling elements in both rows without resorting to any additional spacer or like elements while simplifying appreciably the machining operations.

The angular bearing with two rows of rolling-contact elements according to the present invention comprises a split outer bearing race of which the two portions are held in mutual contact along a radial joint plane. According to the invention, the registering front surfaces of the two portions of the outer bearing race are each provided with at least two axial projections machined with precision to constitute together a radial reference surface. The two projections are separated by axial recesses adapted to receive the corresponding axial projection of the other portion of the bearing race. Thus, it is possible, after causing the relative rotation of the two bearing race portions, to mount the rolling elements of the second row which are equal in number to those of the first row. Furthermore, the bearing according to this invention comprises a peripheral or annular sealing member adapted to cooperate with the split bearing race in order to seal the registering recesses of the two bearing race portions when the corresponding projections of these two portions are in mutual contact through their machined reference faces, thus preventing any ingress of foreign matter such as dust, impurities or the like through the orifices formed by the various axial recesses registering with one another.

To facilitate the relative rotation of the two bearing race portions during the assembling operation, each axial projection is preferably connected to the adjacent recesses through inclined faces.

The two portions of the bearing race may advantageously be locked or kept in their proper relative position by at least two axial pins for accurately positioning the above-defined projections in mutual contact in their assembled condition.

In a preferred form of embodiment of the invention incorporating more particularly a split outer race, the sealing member consists simply of a ring of resilient material such as rubber encompassing the outer race and covering tightly the joint formed therebetween.

Also preferably, the sealing member is provided with at least one lock block adapted to project into the free space left between two registering recesses. If the sealing member consists of a ring of resilient or elastic material, the lock block may take the form of an internal projection formed integrally with the resilient ring. In a modified form of embodiment the sealing member may consist of a split ring of molded plastic, adapted to engage by snap fitting the two portions of the outer bearing race.

Of course, this invention is applicable solely to the 'O' arrangement of the two rows of rolling elements to prevent the bearing loads from parting or divaricating the two portions of the bearing race away from each other.

The assembling method applicable to the rolling contact bearing according to the instant invention comprises the following steps:

The first row of rolling elements are firstly introduced into the bearing, whereafter the first portion of the bearing race adapted to cooperate with the first row of rolling element is fitted in position.

Then, the second portion of the bearing race is fitted while rotating same in the direction to cause the axial projections of each portion to engage the recesses of the other portion. The second row of rolling elements (comprising the same number of elements as the first row) is subsequently mounted.

Finally, the second bearing race portion is rotated in the opposite direction, thus causing the two portions of the bearing race to move axially away from each other, until the accurately machined and registering faces of the corresponding projections of the two portions contact one another.

A clearer understanding of the present invention will be had as the following description of typical forms of embodiment thereof and of their mode of assembling proceeds with reference to the attached drawings, in which:

THE DRAWINGS

FIG. 1 is an axial section showing a first form of embodiment of an angular ball bearing of the duplex type, i.e. comprising two rows of rolling elements and an outer race made of two portions;

FIG. 2 is a side elevational view of the bearing of FIG. 1 showing more particularly the free spaces left between the two portions of the outer race;

FIG. 3 is an axial view similar to FIG. 1 but showing the two portions of the outer race during one of the bearing assembling steps;

FIG. 4 is an axial section showing a modified form of embodiment of the bearing of this invention, the section being taken along the line IV—IV of FIG. 5, and FIG. 5 is a section taken along the line V—V of FIG. 4 from which the balls have been omitted to simplify the figure.

DESCRIPTION OF THE PREFERRED EMBODIMENTS

The rolling-contact duplex angular bearing illustrated diagrammatically by way of example in FIG. 1 constitutes a mounting assembly for the wheel of a motor vehicle, in which the wheel hub and the brake disk (not shown) can be mounted on a flange rigid with the inner race.

As illustrated in FIGS. 1 to 3, the inner race 1 also comprises a bearing portion 2 having its outer surface machined to constitute two contact or race surfaces 3 and 4. A radial flange 5 provided with spaced internally-threaded holes 6 permits the mounting of a brake disk and a wheel hub (not shown).

The outer race 7 consists of two portions or half-races denoted 8 and 9, respectively, and in this example these two portions are substantially identical and symmetrical to each other. The race portions 8 and 9 are manufactured according to well-known forging, stamping or sintering techniques. The two registering front surfaces of these outer race portions 8 and 9 have a visible profile (notably in the side elevational view of FIG. 2) consisting of successive axial projections 10 separated by axial recesses 11. Each axial recess 11 of one outer race portion is adapted to receive one of the projections 10 of the other outer race portion. Under these conditions, the dimensions of recesses 11 in the peripheral direction are equal to or greater than the corresponding dimensions of projections 10. In the axial direction, the depth of recesses 11 is greater than or equal to the protruding dimension or thickness of projections 10 so that the latter can be received in the former.

The outer front face of projections 10 constituting the joint plane is machined with a high degree of precision and constitutes in all cases the reference face of the pair of half-races 8 and 9. In contrast thereto, the recesses 11 are left in their initial or rough state.

The bottom face of each recess 11 is connected to each adjacent projection 10 by means of an inclined face 12 facilitating the relative rotation of the two half-races 8 and 9.

As clearly shown in FIG. 1, axial pins (not shown) are used for keeping the half-races 8 and 9 in the angular position illustrated wherein the front faces of projections 10 of said half-races 8 and 9 engage each other and are kept in this relative position by means of axial pins inserted through aligned through holes 13. The assembly is fastened for example to the suspension arm of a motor vehicle by tightening axial screws engaging tapped holes 14 formed through half-race 8.

The assembly is completed by a resilient annular seal 15 having an outer diameter somewhat smaller than the inner diameter of half-races 8 and 9 so that when fitted in position it will tightly encompass the outer race 7 across the joint plane by advantageously fitting in a relatively shallow peripheral channel thereof. This resilient seal 15 may consist of rubber and though not shown in FIG. 2 is intended for sealing the gaps left free by the registering recesses 11 of the pair of half-races 8 and 9.

It will be seen that the lines of contact 16 and 17 of the two rows of balls 18 and 19 are inclined in opposite directions to the bearing axis XX. This so-called 'O' arrangement is such that it prevents the loads exerted on the bearing from separating the two half-races 8 and 9 from each other.

The rolling surfaces of the pair of half-races 8 and 9 may be machined simultaneously when these are properly assembled by means of the above-mentioned axial pins.

The component elements of the bearing illustrated in FIGS. 1 and 2 are assembled in the manner illustrated in FIG. 3 and described hereinafter. The first row of balls 18 retained by its separator (not shown) is firstly disposed on the inner race 2. Then the first half-race 8 is fitted in position, followed by the second half-race 9, the latter being rotated to cause its axial projections 10 to engage the recesses 11 of the first half-race 8 while, of course, the axial projections 10 of the first half-race 8 engage the recesses 11 of the second half-race 9. As a consequence of this partial rotation, the second half-race 9 is shifted axially to the left as seen in FIG. 3 by a distance corresponding to the axial dimension of projections 10. This movement to the left is sufficient to permit the insertion without any difficulty of the second row of balls 19 comprising the same number of balls as the rolling elements of the first row 18. As a result, the second row of balls 19 has the same load capacity as the first row of balls 18.

The next step consists simply in rotating the second half-race 9 in the direction contrary to the first rotational movement, so that the two half-races 8 and 9 are moved away from each other, the precision-machined registering faces of the projections 10 of both half-races 8 and 9 bearing again flat against each other, as shown in FIGS. 1 and 2. This step is facilitated by the presence of the inclined faces 12. The subsequent insertion of the pins into the aligned holes 13 keeps the assembly locked in its operative condition.

The modified form of embodiment shown in FIGS. 4 and 5, in which similar component elements are designated by the same reference numerals, differs from the preceding form of embodiment only by the fact that the two portions or half-races 20 and 21 constituting the outer race 7 are not assembled by axial pins. In this example, the two half-races 20 and 21 are locked against relative rotation by an inner block 22 constituting an integral part of the resilient annular seal 23. In this case, the resilient annular seal 23 made of a suitable rubber compound comprises at one location of its inner peripheral surface a solid projection or block 22 acting as a wedge member so dimensioned as to extend and fit into one of the free gaps formed by a pair of recesses 11, as shown more particularly in FIG. 5.

In another modified version, the two half-races 20 and 21 are locked likewise against rotation by providing a block engaging a pair of registering recesses 11 but independent of the annular seal encircling the outer race across the joint plane. It will be seen that the block or projection 22 may be fitted with a certain play into the gap formed by two registering recesses 11, so that a slight relative rotation of the two half-races will not impair the normal play of the bearing in actual operation since the rolling surfaces of the outer race have been ground in relation to the reference plane consisting of the precision-machined front surface of projections 10.

It will be seen that in the form of embodiment illustrated in FIGS. 4 and 5 the one-piece inner race 24 has a plain cylindrical configuration, in contrast to the form of embodiment shown in FIGS. 1 to 3 concerning more particularly the mounting of a vehicle wheel.

The number of projections and recesses utilized in the present invention is immaterial. The bearing rolling elements may consist not only of balls as shown in the drawings but also of tapered rollers, the two rows being still arranged according to the so-called 'O' configuration.

Furthermore, it will be seen that it is not compulsory that the two race halves have the same cross-sectional configuration as illustrated in the drawings.

Finally, the annular seal may consist if desired of a split ring of plastic material in case it is not required to have a perfect fluid-tightness in certain applications.

What is claimed is:

1. A duplex angular rolling-contact bearing comprising
   first and second rows of rolling elements, and
   a split race having two portions held in mutual contact along a radial joint plane defining registering front surfaces,
   each of the registering front surfaces of said two portions of said race comprising at least two precision-machined axial projections constituting together a radial reference face,
   said projections being separated by axial recesses adapted to receive the corresponding axial projection of the other race portion enabling, after a relative rotation of the two race portions, the introduction of the rolling elements of the second row, and
   peripheral annular sealing means encompassing said race for sealing the registering recesses of the two race portions when the corresponding projections of the two portions engage each other through their machined reference faces.

2. The duplex angular rolling-contact bearing of claim 1, wherein each said axial projection is connected to and adjacent recess through an inclined portion for facilitating the relative rotation of said two portions of the bearing race.

3. The duplex angular rolling-contact of claim 1, having axial pins for facilitating the assembly of the two portions of the bearing race, said axial pins retaining said projections in the proper position of mutual engagement.

4. The duplex angular rolling-contact bearing of claim 1, wherein said bearing race is the outer race and said annular sealing means comprises a resilient flat ring tightly encompassing said outer race across said joint plane.

5. The duplex angular rolling-contact bearing of claim 1, having at least one lock block penetrating into the gap left between two registering recesses.

6. The duplex angular rolling-contact bearing of claim 5, wherein said lock block is formed integrally with said annular seal.

7. The duplex angular rolling-contact bearing of claim 1, wherein said annular sealing means comprises a split ring.

8. The duplex angular rolling-contact bearing of claim 1, wherein the respective rolling-contact surfaces of said two portions are being machined in relation to the reference plane constituted by the machined faces of said axial projections.

9. The duplex angular rolling-contact bearing of claim 1, wherein the two rows of rolling elements are disposed according to a so-called 'O' arrangement.

10. A method of assembling a duplex angular rolling-contact bearing comprising two rows of rolling elements and a two-portion bearing-race, wherein the registering front surfaces of said two portions of said race comprise each at least two precision-machined axial projections separated by axial recesses, said method comprising the following steps:
   (a) fitting the first row of rolling elements into position,
   (b) fitting into position the first portion of the bearing race for engagement of said first row,
   (c) fitting the second portion of the bearing race into position and rotating it about its longitudinal axis, so that the axial projections of each portion engage the axial recesses of the other portion,
   (d) fitting the second row of rolling elements comprising the same number of such elements as the first row into position, and
   (e) rotating the second portion of the bearing race in the opposite direction, thus on the one hand causing the two portions of the bearing race to move axially away from each other and on the other hand causing the registering precision-machined faces of the now registering projections of the two portions to contact each other.

* * * * *